United States Patent
Kalyandurg et al.

(10) Patent No.: US 6,814,445 B2
(45) Date of Patent: Nov. 9, 2004

(54) DMD HEAT SINK SOCKET ASSEMBLY

(75) Inventors: Satyan Kalyandurg, Plano, TX (US);
Jack D. Grimmett, Carrollton, TX (US)

(73) Assignee: Texas Instruments Incorporated, Dallas, TX (US)

(*) Notice: Subject to any disclaimer, the term of this patent is extended or adjusted under 35 U.S.C. 154(b) by 0 days.

(21) Appl. No.: 10/186,410

(22) Filed: Jul. 1, 2002

(65) Prior Publication Data
US 2003/0020882 A1 Jan. 30, 2003

Related U.S. Application Data

(60) Provisional application No. 60/302,318, filed on Jun. 30, 2001.

(51) Int. Cl.[7] .............................................. G03B 21/16
(52) U.S. Cl. ......................................... 353/52; 348/771
(58) Field of Search .................... 353/52, 122; 349/161; 348/743, 771, 742; 361/687, 688, 697, 702, 709, 710, 720

(56) References Cited

U.S. PATENT DOCUMENTS

| | | | | |
|---|---|---|---|---|
| 5,432,526 A | * | 7/1995 | Hyatt | 345/87 |
| 5,731,952 A | * | 3/1998 | Ohgami et al. | 361/687 |
| 5,898,567 A | * | 4/1999 | Satake | 361/687 |
| 6,384,809 B1 | * | 5/2002 | Smith | 345/101 |
| 2002/0012158 A1 | * | 1/2002 | Smith et al. | 359/290 |
| 2003/0063247 A1 | * | 4/2003 | Kalyandurg | 349/149 |
| 2003/0085659 A1 | * | 5/2003 | Overmann et al. | 315/32 |

* cited by examiner

Primary Examiner—William C. Dowling
(74) Attorney, Agent, or Firm—Charles A. Brill; Wade James Brady, III; Frederick J. Telecky, Jr.

(57) ABSTRACT

A method for removing heat from a spatial light modulator device in a digital projection display by encapsulating the device package in a thermal conductive socket attached to a printed wiring board. The socket wraps around the device package to remove both optically generated heat from the front of the device and electrically generated heat within the device. In higher brightness projector applications, fins are added to the socket to increase the mass and surface area of the socket, thereby improving the heat dissipation properties of the system. The heat sink socket attaches to the printed wiring board using a screw attachment means, which also assures electrical connectivity to the spatial light modulator through a interposer element between the device and spatial light modulator. This approach completely eliminates conventional heat sinks, mounting studs, and fasteners, which have been failure mechanisms in these type displays.

15 Claims, 2 Drawing Sheets

DMD HEAT SINK SOCKET ASSEMBLY

This application claims priority under 35 USC §119(e)(1) of provisional application No. 60/302,318 filed Jun. 30, 2001.

FIELD OF THE INVENTION

The present invention relates to spatial light modulator displays and more specifically to improving the performance of such displays by increasing the thermal dissipation properties of the spatial light modulator.

BACKGROUND OF THE INVENTION

Digital spatial light modulators (SLM) are revolutionizing projection display products. For example, digital micromirror device (DMD™, a type of SLM) projectors are available in SVGA, XGA, and HDTV resolutions. These small, lightweight, projectors provide extremely sharp, high-quality pictures. Liquid crystal displays (LCD) technology offer similar results.

One of the biggest problems associated with these projectors is that of dissipating the heat from the SLM, caused largely by the very bright light focused on the surface of the small device. The SLM also must dissipate heat generated from electrical operation of the device, although at a much lower level. For high performance and long life, these small thumbnail sized devices must be able to dissipate the large amount of heat, which is generated by the combination of incoming light flux on its surface and electrical operation internal to the device.

Typically in DMD displays, heat sinks are attached to the devices to mitigate and control the temperature properties of the system. A stud is bonded to the back surface of the DMD package with an epoxy or double-sided tape. The stud is then attached with fasteners to a heat sink to create a thermal path for removing heat from the device. This is a labor-intensive process and has proven to be a major concern relative to the high-performance and reliability of the system. The studs can break off due to inconsistency from batch-to-batch of the epoxy patch material used in attaching them. There can also be inherent variations in the bonding process, assembly, curing, holding force, and other process complexities. All of these complications, which often result in returned product, tend to drive up the system cost.

What is needed is a method that eliminates the stud, heat sink, and fasteners and provides an optimal path for removing heat from the device(s). The method of the present invention accomplishes this by making the SLM socket out of a thermally conductive material and having it encapsulate the device package, making positive contact with the package perimeter. This socket/heat sink combination is then clamped to a copper plane on a printed wiring board (PWB) to effectively remove the heat from the SLM. Since this socket/heat sink wraps around the device, covering the front edges around the cover glass of the device package, this directly addresses the removal of excessive heat generated by the optical flux applied to the surface of the device.

SUMMARY OF THE INVENTION

This invention discloses a method for removing heat from a SLM device in a digital projection display by encapsulating the device in a thermal conductive socket attached to a PWB. The socket wraps around the device package to remove both optically generated heat from the front of the device and electrically generated heat within the device. The socket is in positive thermal contact with the perimeter of the device with the gap at the interface to the PWB being also filled with a conductive medium. A connectivity interposer element is inserted between the bottom of the device and the PWB for electrical connection to the device. In higher brightness projector applications, fins are added to the socket to increase the mass and surface area of the socket, thereby improving the heat dissipation properties of the system. The heat sink socket is attached to the PWB using a screw attachment means. As the device is attached to the PWB, the applied pressure causes the interposer element to make electrical contact between the PWB and SLM device.

This approach completely eliminates conventional heat sinks, mounting studs, and fasteners, which tend to be low-yield, and high-cost items in fabricating a projection display. The problem of the heat sink stub breaking off and causing the display to fail is eliminated by this method. The fail-safe approach of this invention positions, aligns, clamps, and heat sinks the SLM in a straightforward manner to provide a high-performance, long-life projection system.

BRIEF DESCRIPTION OF THE DRAWINGS

For a more complete understanding of the present invention, and the advantages thereof, reference is now made to the following descriptions taken in conjunction with the accompanying drawings, in which:

FIG. 1b is a front view of the SLM heat sink socket of FIG. 1a.

DETAILED DESCRIPTION OF THE PREFERRED EMBODIMENT

This invention discloses a method for removing heat from a SLM device in a digital projection display by encapsulating the device in a thermal conductive socket attached to a PWB. The socket wraps around the device package and is in thermal contact with the package perimeter to remove both optically generated heat from the front of the device and electrically generated heat within the device and further transfers the heat to a copper thermal plane on the PWB.

Figure 1A:
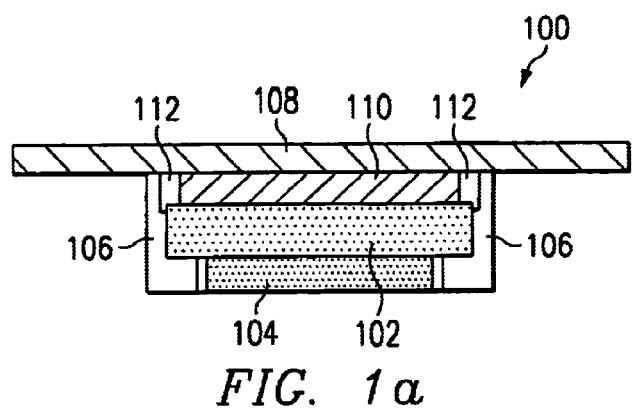
FIG. 1a is a cross sectional view of the SLM heat sink socket of the present invention.
Figure 1B:
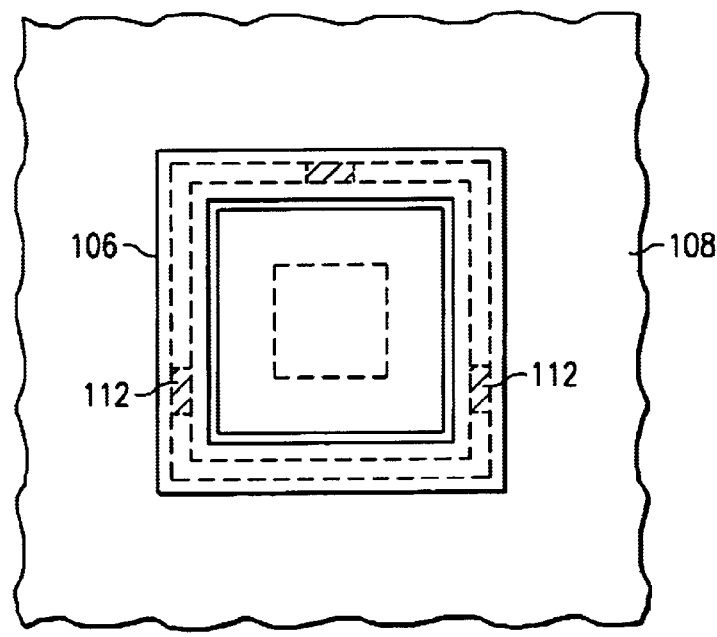

FIGS. 1a and 1b are cross-sectional and front view drawings, respectively, showing the heat sink/socket assembly 100. The SLM (DMD) package 102 with optical cover glass 104 is encapsulated by the heat sink/socket 106. The socket 106 is in positive contact with the perimeter of the SLM package, including the front of the device around the cover glass 104. A connectivity element (interposer) 110 is applied between the pads on the bottom of the SLM package and the PWB 108 for the purpose of making electrical contact between the PWB and the device package. A conductive medium 112 is applied in the gap at the interface between the heat sink/socket and the PWB. A screw attachment means is used to attach the assembly 100 to the PWB 108. This process clamps the SLM package 102, compresses the interposer 110 to make electrical contact, and connects the conductive heat path between the heat sink and the copper plane on the PWB. The heat sink/socket is fabricated from a group of conductive materials including, but not limited to Aluminum, zinc, copper, and magnesium.

The combination heat sink/socket assembly process totally eliminates the need for traditional heat sinks, stubs, and fasteners. This approach aligns and positions the device, clamps and holds the device, heat sinks the device, and makes a thermal interface with the PWB in a straightforward, fail-safe manner. The reduction in parts improves the productivity of the system, lowers the cost, and reduces the weight by at least 5 ounces. The copper planes on the PWB can be adjusted to meet the heat dissipation requirements of the system.

The process for the heat sink assembly of the present invention, which is simple and straightforward, includes the steps of: placing the heat sink socket 106 in a fixture, placing the SLM or DMD package 102 upside down in the socket where it is properly aligned, filling the gap at the interface of the socket and PWB with a conductive medium 112, placing the interposer element 110 in place over the contact pads on the SLM, aligning the mounting location of the PWB 108 over the assembly, and attaching the assembly to the PWB using screws. This provides an assembly with the SLM firmly attached to the PWB with good electrical connectivity, and the SLM encapsulated inside the heat sink with a direct thermal path to the copper PWB plane.

Figure 2A:
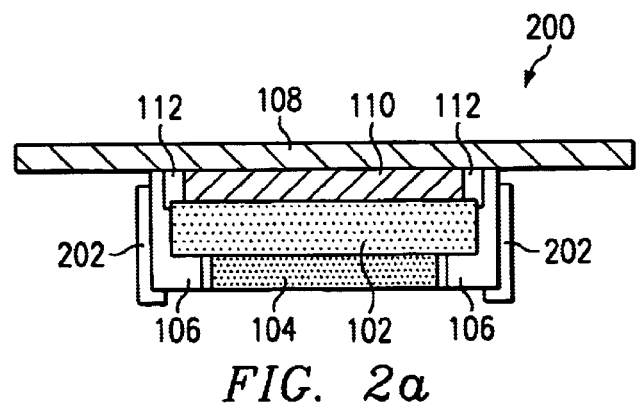
FIG. 2a is a cross sectional view of the SLM heat sink socket of the present invention, with fins added to the socket to boost the mass and surface area of the heat sink, thereby improving the heat dissipation capabilities.
Figure 2B:
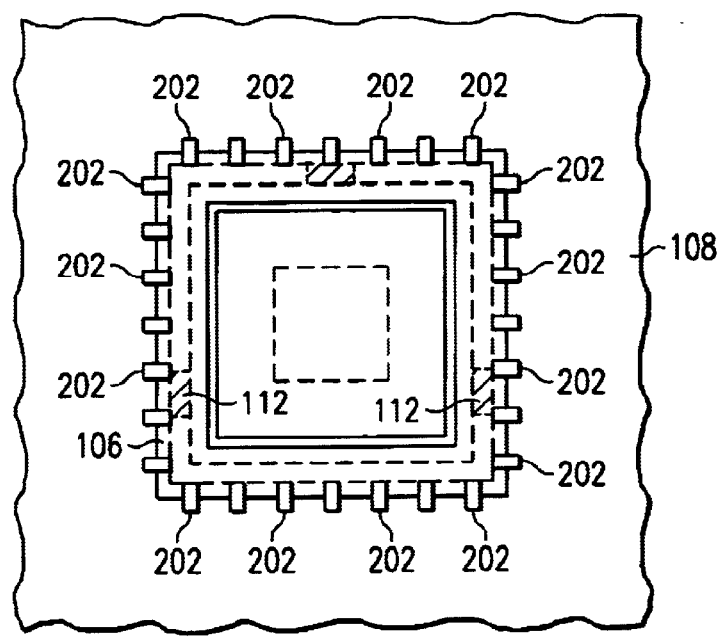
FIG. 2b is a front view of the SLM heat sink socket of FIG. 2a with added fins.

FIGS. 2a and 2b are cross-sectional and front view drawings, respectively, showing the heat sink/socket assembly with fins 202 added to the heat sink socket 106. These fins add mass and surface area to the heat sink to increase the thermal capacity of the assembly 200 when used in high brightness applications.

Figure 3:
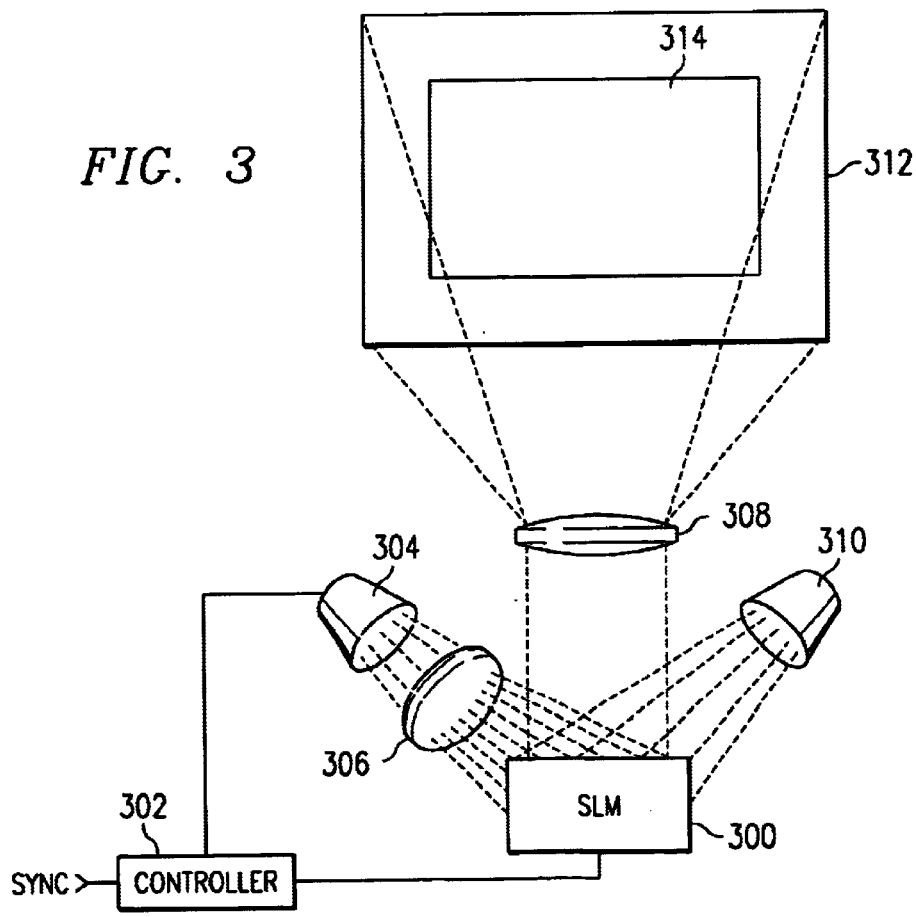
FIG. 3 is a block diagram of a high-performance SLM projection display incorporating the heat sink socket thermal properties of the present invention.

FIG. 3 is a block diagram of a projection display, which uses the SLM heat sink socket assembly of the present invention. A high-level illumination flux from a lamp 304 is focused along a first light path on to an SLM 300 where it is modulated and reflected off the surface of the individual pixels. If the pixels are turned ON, the light is reflected along a second light path, through a projection lens 308 on to a display screen 312 to present a sharp image 314. If the pixels are OFF, the light is reflected along a third light path, out of the aperture of the projection lens 308, into a light trap 310 and discarded. A controller 302 provides the electrical signals to the lamp 304 and the SLM 300. The SLM is a small device on the order of one-half to one square inches in area with a very bright light beam focused on its surface. It is critical that the heat generated from this light source, as well a lesser amount of electrically generated heat internal to the device, be removed from the device to maintain a safe and usable operating range. In this case the SLM package is encapsulated in the conductive socket, which serves as both a heat sink with thermal path to the PWB and as a clamp to accurately and securely hold the device in alignment. Projection displays equipped with the heat sink socket assembly of the present invention will cost less to manufacture, will be more reliable, and have a longer operating life.

While this invention has been described in the context of a preferred embodiment, it will be apparent to those skilled in the art that the present invention may be modified in numerous ways and may assume embodiments other than that specifically set out and described above. Accordingly, it is intended by the appended claims to cover all modifications of the invention that fall within the true spirit and scope of the invention.

What is claimed is:

1. A method of attaching a spatial light modulator to a heat sink, the method comprising:

providing a spatial light modulator; and encapsulating said spatial light modulator in a heat sink socket coupled to a printed wiring board heat plane.

2. The method of claim 1, further comprising the steps of:

mounting a heat sink socket in a holding fixture;

placing said spatial light modulator device in said socket;

applying a conductive medium in a printed wiring board interface gap of said heat sink socket;

installing a connectivity interposer element over an electrical contact area of said spatial light modulator;

positioning said printed wiring board over the spatial light modulator/heat sink assembly; and clamping said spatial light modulator/heat sink assembly to said printed wiring board.

3. The method of claim 1, wherein said spatial light modulator socket is in positive thermal contact with a perimeter of said spatial light modulator device to provide a heat sinking path to said printed wiring board.

4. The method of claim 2, wherein electrical contact to said spatial light modulator device is made by applying pressure to said interposer element when said spatial light modulator is clamped to said printed wiring board.

5. The method of claim 1, wherein said spatial light modulator is a digital micromirror device.

6. A heat sink socket assembly for transferring heat from a spatial light modulator device, comprising:

a spatial light modulator for receiving and modulating optical flux;

a printed wiring board providing electronic control signals to said spatial light modulator, said signals being coupled to said spatial light modulator by means of a connectivity interposer element;

a heat sink socket encapsulating said spatial light modulator in positive contact with a perimeter surface of said spatial light modulator;

a conductive medium filling a contact interface gap between said heat sink socket and said spatial light modulator; and a means for clamping said heat sink socket and spatial light modulator assembly to said printed wiring board, so that said socket is in thermal contact with a thermal plane on said printed wiring board.

7. The assembly of claim 6, wherein said clamping means provides pressure to said connectivity interposer element, thereby making electrical contact between said printed wiring board and said spatial light modulator.

8. The assembly of claim 6, wherein said heat sink socket is fabricated from a group of materials comprising Aluminum, zinc, copper, and magnesium.

9. The assembly of claim 6, wherein said spatial light modulator heat sink socket positions said spatial light modulator on said printed wiring board; aligns said spatial light modulator to said printed wiring board; clamps said spatial light modulator to said printed wiring board; and electronically interfaces said spatial light modulator to said printed wiring board.

10. The assembly of claim 6, wherein said thermal planes on said printed wiring board accept the heat transfer from said spatial light modulator heat sink socket assembly.

11. The assembly of claim 6, wherein said spatial light modulator is a digital micromirror device.

12. The assembly of claim 6, said heat sink socket having fins extending therefrom.

13. A projection display system comprising:
- a light source for producing a beam of light along a first light path;
- a spatial light modulator for receiving said light along said first light path, modulating said light on a pixel-by-pixel basis and reflecting said light along a second light path
- a heat sink socket assembly connected to a thermal plane on a printed wiring board, said heat sink socket being in thermal contact with a perimeter of said spatial light modulator so as to enclose said spatial light modulator between said heat sink socket and said printed wiring board;
- control electronics for receiving image data and controlling said spatial light modulator; and
- a projection lens in said second light path.

14. The assembly of claim 13, wherein said heat sink socket is fabricated from a group of materials comprising Aluminum, zinc, copper, and magnesium.

15. The assembly of claim 13, wherein said spatial light modulator is a digital micromirror device.

* * * * *